No. 897,574. PATENTED SEPT. 1, 1908.
A. BECHT.
VALVE MECHANISM FOR FLUID MOTORS.
APPLICATION FILED MAR. 31, 1904.

3 SHEETS—SHEET 1.

WITNESSES:

INVENTOR
Albert Becht.
BY his ATTORNEY

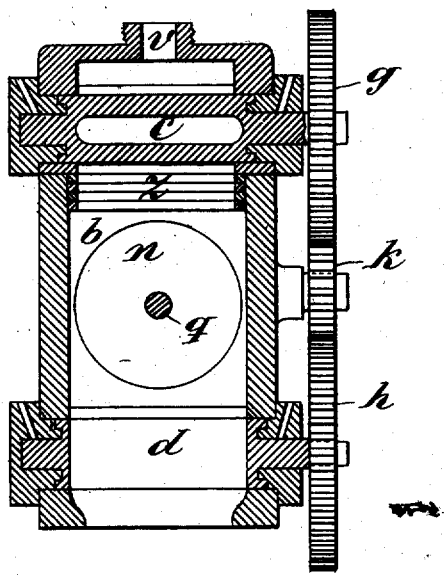
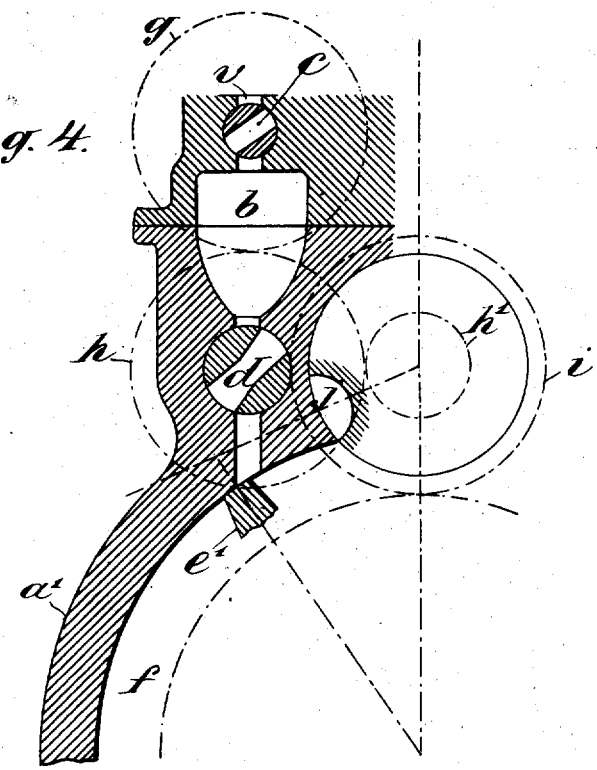

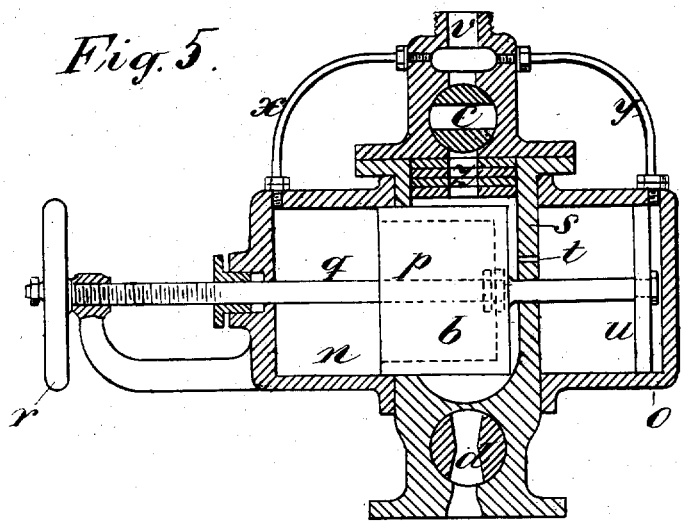
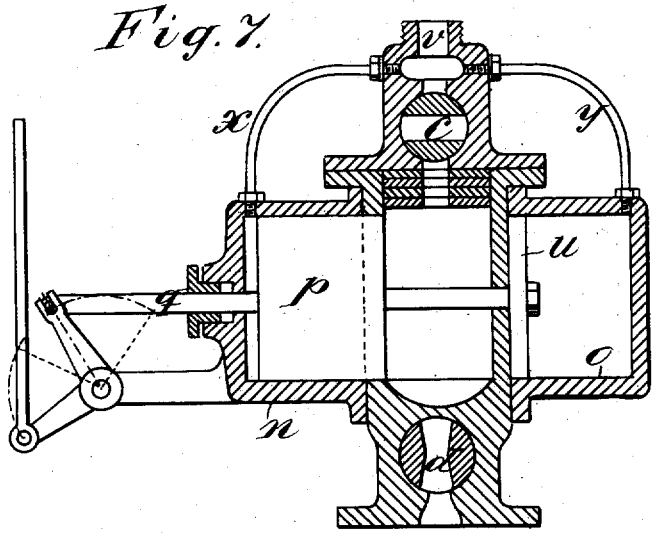

UNITED STATES PATENT OFFICE.

ALBERT BECHT, OF PARIS, FRANCE.

VALVE MECHANISM FOR FLUID-MOTORS.

No. 897,574.  Specification of Letters Patent.  Patented Sept. 1, 1908.

Application filed March 31, 1904. Serial No. 201,007.

*To all whom it may concern:*

Be it known that I, ALBERT BECHT, a citizen of the French Republic, residing in Paris, France, have invented certain new and useful Improvements in Valve Mechanisms for Fluid-Motors, of which the following is a specification.

This invention relates to means for the distribution of gaseous fluids in fluid motors of all kinds; and it is characterized by the employment of an intermediate measuring chamber interposed between the feed-conduit of the fluid under pressure, and the motor cylinder, or other chamber in which the motor fluid is intended to act. This intermediate chamber is disposed between two cut-off cocks or the like of any suitable kind, for example like those employed in thermic or hydraulic motors, such as plane, cylindrical or conical cocks, valves, piston slide-valves, ported rocking valves, etc. said cut-off devices being so set as to avoid wire-drawing. This intermediate chamber serves for the reception of a certain measured quantity of the motor fluid, which is only permitted to escape and act on the motor parts of the engine (as a piston, pallets, or like parts) at predetermined times. Means are provided for varying the capacity of the intermediate chamber at will within limits.

In order that the invention may be readily and clearly understood and readily carried into effect by those skilled in the art to which it appertains, it will now be described in detail with reference to the accompanying drawings, which illustrate embodiments thereof.

Figure 1:
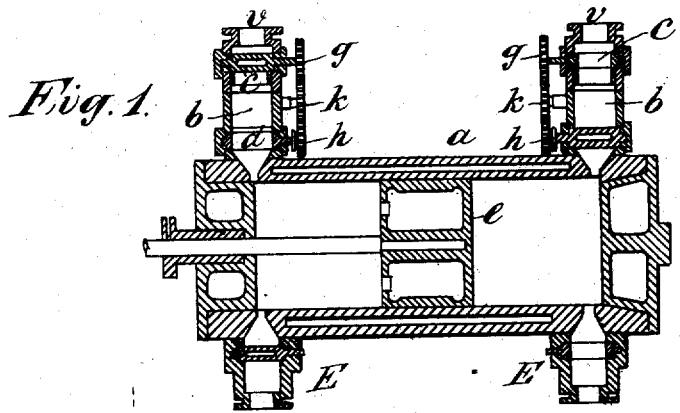
Figure 2:
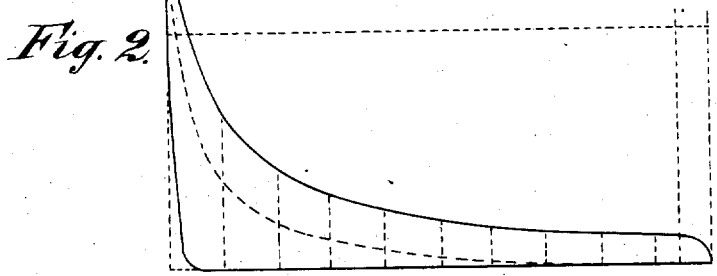
Figure 3:
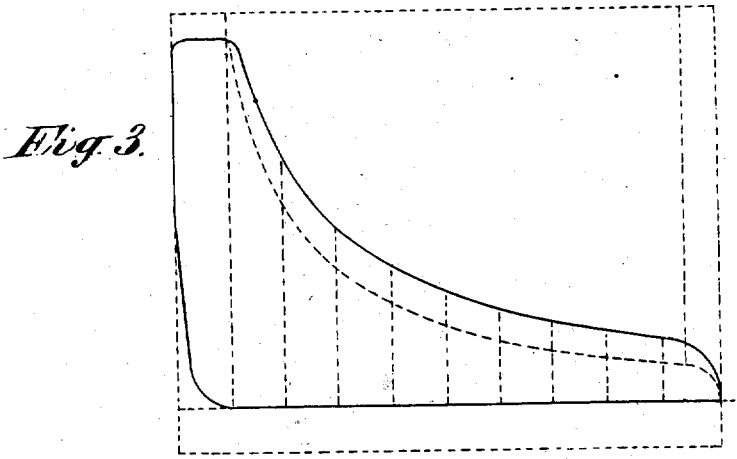

In these drawings—Figure 1 is a longitudinal, axial section of the cylinder of a steam engine provided with the invention; and Figs. 2 and 3 are diagrams illustrating the manner in which the fluid-distribution acts. Fig. 4 is a diagrammatic sectional view showing the adaptation of the invention to a rotary, fluid-motor. Figs. 5 and 6, are, respectively, longitudinal and transverse sections of the intermediate measuring chamber and its controlling means, the chamber being a cylinder provided with a plunger for varying its capacity. Fig. 7 is a transverse section similar to Fig. 5, but showing the piston adapted for control by a governor.

Referring particularly to Fig. 1, which shows an ordinary reciprocating steam engine, $a$ is the cylinder, and $e$ the piston playing therein. The cylinder has fluid supply inlets $v$ one at each end. At each inlet is a measuring chamber $b$, the entrance of the fluid to which is controlled by a cock $c$; the flow of the fluid from the chamber $b$ to the engine cylinder $a$ is controlled by a cock $d$. These cocks, or valves, may be of the Corliss type and may be actuated and controlled by gear wheels or levers; one condition being that the inlet cock $c$ shall be closed before the outlet cock $d$ opens. The cocks as shown in Fig. 1 are rotary, and the gear-wheels $g$ and $h$ which drive them are geared together through an intermediate wheel $k$. When the piston reaches the end of its stroke, the cock $d$ at that end opens and the steam from the chamber $b$ controlled by that cock, flows into the cylinder behind the piston. As the steam enters the cylinder and displaces the piston in the latter, it expands, producing a diagram such as that seen in Fig. 2, wherein the curved dotted line shows the expansion curve of the steam that, in the ordinary engine is contained in the clearance space at the end of the cylinder. The exhaust takes place in the usual way and is controlled by the usual valves E.

By suitably modifying the relative positions of the cocks or valves $c$ and $d$, it is possible to retard the closing of the cock $c$ and so arrange that it shall remain open, or partly open, while the cock $d$ is also open, and this during a portion of the travel of the piston $e$. In this manner the diagram seen in Fig. 3 is obtained, wherein the curved dotted line indicates the expansion curve obtained with the ordinary system when the steam is admitted during the same portion of the stroke.

As will be readily understood the described devices for distributing the motor fluid has special advantages where superheated steam is employed, and they permit of attaining in one and the same cylinder a sufficiently complete expansion of the steam, thereby obviating the employment of double and triple expansion heretofore required in order to obtain efficient utilization of the motor fluid.

In Fig. 4 is shown the application of the invention to a rotary motor. At the upper part of the cylinder $a^1$ of the motor is situated the intermediate measuring chamber $b$; the entry of the fluid is controlled by the rotary cock or valve $c$, and the flow of the fluid from the chamber $b$ to the annular chamber $f$ of the cylinder, is controlled by the rotary cock or valve $d$. In the annular chamber or space $f$ moves a pallet or piston $e^1$, carried by a rotating disk in a known way. The cocks $c$ and $d$ are rotated by means of the gear-wheels $g$, and $h$, represented diagrammatically in this figure. The cocks $c$ and $d$ are so set that the cock $c$ closes at the moment the cock $d$ is about to open. As the cocks $c$ and $d$ are coupled together for driving, it will be obvious that they can be set so that the cock $c$ will remain open for a little time after the cock $d$ shall have opened whereby the motor fluid will continue to enter during a predetermined part of the stroke. At the right in Fig. 4 is shown the rotary abutment $i$ provided with a recess $j$ for the pallet. This abutment is driven through the gear-wheels $h$ and $h^1$.

In order to obviate the necessity for angular displacement in the keying of the parts controlling the cocks $c$ and $d$, for regulating the speed and power of the engines, means may be employed for varying the capacity of the chamber $b$, such means being actuated either by hand, or automatically under the control of a governor. Figs. 5, 6 and 7 illustrate a mechanism of this character. In these figures $p$ is a plunger adapted to play in a cylinder $n$ which branches laterally from the chamber $b$, said plunger having a stem $q$ and hand-wheel $r$. Alined with the cylinder $n$, and separated from the chamber $b$ by a partition $s$, is a cylinder $o$, in which plays a compensating piston $u$, on a prolongation of the stem $q$ that extends through the partition $s$. In this partition $s$ is a small hole or port $t$, and the spaces in the cylinders $n$ and $o$ back of the respective pistons therein, are connected by the respective pipes $x$ and $y$, with the fluid inlet $v$ back of the cocks $c$. This last named device serves to equalize the pressure on the plunger $p$; and in order to vary the capacity of the chamber $b$ it is only necessary to move the plunger more or less into or out from said chamber. The small hole $t$ permits of the fluid flowing through the partition as occasion requires and to always leave a cushion in the space between said partition and the piston $u$.

The construction shown in Fig. 7 is precisely the same as that in Fig. 5, except that in lieu of the hand-wheel $r$, means are employed for actuating the plunger through the medium of a governor. In this figure the means shown comprise an elbow-lever $w$, one arm of which is coupled to the stem $q$ and the other to an operating rod $w^1$, adapted to extend up to a governor (not shown).

When it is not necessary to attain a uniform speed,—as for example in driving winches, cranes, boats, etc.,—and it is not necessary to employ the shifting plunger, the intermediate chamber being sufficiently spacious, there may be fitted in the upper part of the chamber $b$ (see Figs. 5, 6 and 7) removable filling plates $z$, apertured to permit the passage of the fluid. There may be any number of these plates and they serve to fill up the chamber in part and to thus more or less reduce its capacity, the reduction depending, of course, on the number of plates inserted. These filling plates have the advantage of permitting the utilization, for one and the same motor, of different steam generators operating at very different pressures between six and fifteen kilograms. The plunger $p$ and the filling plates $z$ may, of course, be used at the same time, as the plunger, as shown in Figs. 5, 6 and 7.

Having thus described my invention, I claim—

1. A motor to be operated by a gaseous fluid under pressure, having a measuring chamber through which the fluid must pass on its way to the motor, a cock between said chamber and the motor, a cock between said chamber and the source of supply of the fluid, means for differently operating these cocks, so as to avoid wire-drawing the fluid, and means for varying the capacity of the said chamber.

2. A motor to be operated by a gaseous fluid under pressure, having a measuring chamber through which the fluid must pass on its way to the motor, a cock between said chamber and the motor, a cock between said chamber and the source of supply of the fluid, means for differently operating these cocks, and means for varying the capacity of the said chamber, said means comprising a movable plunger, adapted to move into and out of said chamber, and means for equalizing the pressure on said plunger.

3. A motor to be operated by a gaseous fluid under pressure, having a measuring chamber through which the fluid must pass on its way to the motor, a cock between said chamber and the motor, a cock between said chamber and the source of supply of the fluid, means for operating these cocks, and means for varying the capacity of the said chamber, said means comprising a cylinder $n$, branching from said chamber, a plunger $p$ in said cylinder, a stem on said plunger for operating it, a cylinder $o$ alined with the cylinder $n$, a partition between said cylinder and said chamber having in it an aperture $t$, a piston $u$ in the cylinder $o$ and fixed on the prolonged stem of the plunger, and pipes which supply the fluid under pressure to the outer ends of the respective cylinders $n$ and $o$, to equalize the pressure on the plunger.

In witness whereof, I have hereunto signed my name in the presence of two subscribing witnesses.

ALBERT BECHT.

Witnesses:
JULES ARMENGAUD, Jeune,
HANSON C. COXE.